US012691373B2

(12) United States Patent
Peng

(10) Patent No.: US 12,691,373 B2
(45) Date of Patent: Jul. 28, 2026

(54) STATE BASED ACTION BUTTONS

(71) Applicant: Bungie, Inc., Bellevue, WA (US)

(72) Inventor: Gregory Peng, Bellevue, WA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 120 days.

(21) Appl. No.: 18/281,278

(22) PCT Filed: Mar. 9, 2022

(86) PCT No.: PCT/US2022/019645
§ 371 (c)(1),
(2) Date: Sep. 8, 2023

(87) PCT Pub. No.: WO2022/192468
PCT Pub. Date: Sep. 15, 2022

(65) Prior Publication Data
US 2024/0207720 A1     Jun. 27, 2024

Related U.S. Application Data

(60) Provisional application No. 63/158,952, filed on Mar. 10, 2021.

(51) Int. Cl.
*A63F 13/2145*       (2014.01)
*G06F 3/04886*       (2022.01)

(52) U.S. Cl.
CPC ...... *A63F 13/2145* (2014.09); *G06F 3/04886* (2013.01)

(58) Field of Classification Search
CPC .. A63F 13/2145; A63F 13/42; G06F 3/04886; G06F 3/04817; G06F 3/0482; G06F 3/0488

(Continued)

(56) References Cited

U.S. PATENT DOCUMENTS

2005/0176502 A1      8/2005  Nishimura et al.
2006/0252542 A1*   11/2006  Nicely ................... G07F 17/32
                                                                        463/36

(Continued)

FOREIGN PATENT DOCUMENTS

AU        2022232383         10/2023
AU        2022234308         10/2023

(Continued)

OTHER PUBLICATIONS

International Patent Application No. PCT/US2022/019645, International Search Report and Written Opinion mailed Jun. 16, 2022, 9 pages.

(Continued)

*Primary Examiner* — Michael C Grant
(74) *Attorney, Agent, or Firm* — Kilpatrick Townsend & Stockton LLP

(57)          ABSTRACT

Described herein are techniques for implementing a virtualized physical controller. The techniques may comprise receiving. from a user via a touchscreen display. a first touch input corresponding to at least one input mechanism of a set of input mechanisms. determining a first state that is currently active. generating. based on the first state. first activation data that includes an indication of a first action. The techniques may further comprise receiving. from the user via the touchscreen display. a second touch input corresponding to the at least one input mechanism. determining a second state that is currently active, and generating. based on the second state, second activation data that includes an indication of a second action different from the first action.

20 Claims, 7 Drawing Sheets

(58) Field of Classification Search
USPC ......................................................... 463/37
See application file for complete search history.

(56) References Cited

U.S. PATENT DOCUMENTS

| | | | |
|---|---|---|---|
| 2007/0060335 | A1 | 3/2007 | Sakaguchi et al. |
| 2009/0181770 | A1 | 7/2009 | Viner et al. |
| 2009/0191968 | A1 | 7/2009 | Johnson et al. |
| 2010/0248843 | A1 | 9/2010 | Karsten |
| 2014/0187328 | A1 | 7/2014 | Reynolds et al. |
| 2015/0072784 | A1 | 3/2015 | Lee |
| 2016/0287990 | A1 | 10/2016 | Garvin et al. |
| 2017/0340959 | A1 | 11/2017 | Tang et al. |
| 2018/0043254 | A1 | 2/2018 | Soejima et al. |
| 2020/0174618 | A1 | 6/2020 | Wang et al. |
| 2020/0179805 | A1 | 6/2020 | Miao |
| 2020/0282308 | A1 | 9/2020 | Guo et al. |
| 2020/0289933 | A1 | 9/2020 | Seropian et al. |
| 2020/0298104 | A1 | 9/2020 | Wang |
| 2024/0149146 | A1 | 5/2024 | Timmins et al. |
| 2024/0149147 | A1 | 5/2024 | Peng |

FOREIGN PATENT DOCUMENTS

| | | |
|---|---|---|
| AU | 2022234961 | 10/2023 |
| CA | 3212868 | 9/2022 |
| CA | 3212970 | 9/2022 |
| CA | 3212972 | 9/2022 |
| CN | 108635850 | 10/2018 |
| CN | 108635850 A | 10/2018 |
| CN | 112169315 A | 1/2021 |
| CN | 112261973 | 1/2021 |
| CN | 116964550 | 10/2023 |
| CN | 116964552 | 10/2023 |
| CN | 117043736 | 11/2023 |
| EP | 4288860 | 12/2023 |
| EP | 4291975 | 12/2023 |
| EP | 4291976 | 12/2023 |
| IL | 305742 | 11/2023 |
| IL | 305743 | 11/2023 |
| IL | 305749 | 11/2023 |
| JP | 2005-218778 | 8/2002 |
| JP | 4243553 B2 | 1/2009 |
| JP | 4317774 B2 | 5/2009 |
| JP | 4937421 B2 | 3/2012 |
| JP | 2015-123244 | 7/2015 |
| JP | 2015-231545 | 12/2015 |
| JP | 5879007 B1 | 2/2016 |
| JP | 6045837 B2 | 11/2016 |
| JP | 2016-201028 | 12/2016 |
| JP | 2017-012423 | 1/2017 |
| JP | 6143934 B1 | 5/2017 |
| JP | 2018-086275 | 6/2018 |
| JP | 2018-097649 | 6/2018 |
| JP | 2018-161446 | 10/2018 |
| JP | 6447853 B1 | 12/2018 |
| JP | 6480531 B1 | 2/2019 |
| JP | 2019-150269 | 9/2019 |
| JP | 2019-212119 | 12/2019 |
| JP | 2020-028652 | 2/2020 |
| JP | 2020-192239 | 12/2020 |
| JP | 2021000192 A | 1/2021 |
| JP | 2021029291 A | 3/2021 |
| JP | 2024-511304 | 3/2024 |
| JP | 2024-513669 | 3/2024 |
| JP | 2024-513672 | 3/2024 |
| KR | 10-2013-0027621 | 3/2013 |
| KR | 10-1411684 | 6/2014 |
| KR | 20140077991 A | 6/2014 |
| KR | 10-2014-0127931 | 11/2014 |
| KR | 10-2020-0091897 | 7/2020 |
| MX | /a/2023/010550 | 9/2023 |
| MX | /a/2023/010552 | 9/2023 |
| MX | /a/2023/010553 | 9/2023 |
| WO | WO 2013/173838 | 11/2013 |
| WO | WO 2022/192468 | 9/2022 |
| WO | WO 2022/192471 | 9/2022 |
| WO | WO 2022/192492 | 9/2022 |

OTHER PUBLICATIONS

Canadian Application No. 3,212,972, Examiner's Report dated Dec. 5, 2024.

Japanese Application No. 2023-554299, Decision of Refusal dated Dec. 12, 2024.

UAE Application No. P6002241/2023, Examination Report and Search Report dated Dec. 13, 2024.

UAE Application No. P6002244/2023, Examination Report and Search Report dated Dec. 13, 2024.

UAE Application No. P6002248/2023, Examination Report and Search Report dated Dec. 13, 2024.

European Application No. 22767958.6, Extended European Search Report dated Jul. 9, 2024.

European Application No. 22767945.3, Extended European Search Report dated Jul. 25, 2024.

Australian Application No. 2022234961, Second Examination Report dated Aug. 16, 2024.

Australian Application No. 2022232383, Second Examination Report dated Sep. 24, 2024.

European Application No. 22767943.8, Extended European Search Report dated Aug. 16, 2024.

Japanese Application No. 2023-554299, Non-Final Notification of Reasons for Refusal dated Sep. 10, 2024.

Japanese Application No. 2023-553638, Non-Final Notification of Reasons for Refusal dated Oct. 1, 2024.

PCT Application No. PCT/US2022/019681, International Search Report dated Jun. 21, 2022.

PCT Application No. PCT/US2022/019681, International Preliminary Report on Patentability dated Sep. 12, 2023.

PCT Application No. PCT/US2022/019645, International Preliminary Report on Patentability dated Sep. 12, 2023.

PCT Application No. PCT/US2022/019648, International Search Report and Written Opinion dated Jun. 16, 2022.

PCT Application No. PCT/US2022/019648, International Preliminary Report on Patentability dated Sep. 12, 2023.

Australian Application No. 2022234308, First Examination Report dated Jan. 11, 2024.

Australian Application No. 2022234961, First Examination Report dated Jan. 12, 2024.

Australian Application No. 2022232383, First Examination Report dated Jan. 13, 2024.

Australian Application No. AU2022234961, "Notice of Acceptance", mailed Jan. 9, 2025, 3 pages.

European Application No. EP22767943.8, Extended European Search Report, mailed Feb. 11, 2025, 11 pages.

European Application No. EP22767943.8 , "Supplementary European Search Report", mailed Feb. 14, 2025, 1 page.

U.S. Appl. No. 18/281,274, Luke Timmins, Infinite Drage and Swipe U Turn, filed Sep. 8, 2023.

P6002241/2023, Luke Timmins, Infinite Drag and Swipe for Virtual Controller, Sep. 7, 2023.

2022234308, Luke Timmins, Infinite Drag and Swipe for Virtual Controller, Sep. 18, 2023.

U.S. Pat. No. 3,212,868, Luke Timmins, Infinite Drag and Swipe for Virtual Controller, Sep. 7, 2023.

202280020263.1, Luke Timmins, Infinite Drag and Swipe for Virtual Controller, Sep. 8, 2023.

22767958.6, Luke Timmins, Infinite Drag and Swipe for Virtual Controller, Sep. 6, 2023.

305742, Luke Timmins, Infinite Drag and Swipe for Virtual Controller, Sep. 7, 2023.

2023-554299, Luke Timmins, Infinite Drag and Swipe for Virtual Controller, Sep. 6, 2023.

MX/a/2023/010550, Luke Timmins, Infinite Drag and Swipe for Virtual Controller, Sep. 7, 2023.

803788, Luke Timmins, Infinite Drag and Swipe for Virtual Controller, Sep. 18, 2023.

(56) References Cited

OTHER PUBLICATIONS

PCT/US2022/019681, Luke Timmins, Infinite Drag and Swipe for Virtual Controller, Oct. 10, 2022.

2023124994, Luke Timmins, Infinite Drag and Swipe for Virtual Controller, Sep. 29, 2023.

523450614, Luke Timmins, Infinite Drag and Swipe for Virtual Controller, Sep. 10, 2023.

P6002244/2023, Gregory Peng, State Based Action Buttons, Sep. 7, 2023.

2022234961, Gregory Peng, State Based Action Buttons, Sep. 19, 2023.

U.S. Pat. No. 3,212,970, Gregory Peng, State Based Action Buttons, Sep. 7, 2023.

202280019768.6, Gregory Peng, State Based Action Buttons, Sep. 8, 2023.

22767943.8, Gregory Peng, State Based Action Buttons, Sep. 10, 2023.

305743, Gregory Peng, State Based Action Buttons, Sep. 7, 2023.

2023-553638, Gregory Peng, State Based Action Buttons, Sep. 4, 2023.

MX/a/2023/010552, Gregory Peng, State Based Action Buttons, Sep. 7, 2023.

803844, Gregory Peng, State Based Action Buttons, Sep. 19, 2023.

PCT/US2022/019645, Gregory Peng, State Based Action Buttons, Mar. 9, 2022.

2023124995, Gregory Peng, State Based Action Buttons, Sep. 29, 2023.

523450612, Gregory Peng, State Based Action Buttons, Sep. 10, 2023.

U.S. Appl. No. 18/281,279, Gregory Peng, Virtual Button Charging, filed Sep. 8, 2023.

P6002248/2023, Gregory Peng, Virtual Button Charging, Sep. 7, 2023.

2022232383, Gregory Peng, Virtual Button Charging, Sep. 19, 2023.

U.S. Pat. No. 3,212,972, Gregory Peng, Virtual Button Charging, Sep. 8, 2023.

202280020310.2, Gregory Peng, Virtual Button Charging, Sep. 8, 2023.

22767945.3, Gregory Peng, Virtual Button Charging, Sep. 15, 2023.

305749, Gregory Peng, Virtual Button Charging, Sep. 7, 2023.

2023-553639, Gregory Peng, Virtual Button Charging, Sep. 4, 2023.

MX/a/2023/010553, Gregory Peng, Virtual Button Charging, Sep. 7, 2023.

803836, Gregory Peng, Virtual Button Charging, Sep. 19, 2023.

PCT/US2022/019648, Gregory Peng, Virtual Button Charging, Mar. 9, 2022.

2023125045, Gregory Peng, Virtual Button Charging, Sep. 29, 2023.

523450616, Gregory Peng, Virtual Button Charging, Sep. 10, 2023.

Canadian Application No. 3,212,868, Examiner's Report dated Nov. 12, 2024.

Canadian Application No. 3,212,970, Examiner's Report dated Nov. 14, 2024.

Japanese Application No. 2023-553639, Non-Final Notification of Reasons for Refusal dated Oct. 8, 2024.

Japanese Application No. JP2023-553638 , Notice of Decision to Grant, Mailed On May 7, 2025, 3 pages.

New Zealand Application No. NZ803844, "First Examination Report", mailed Apr. 7, 2025, 4 pages.

* cited by examiner

400

600

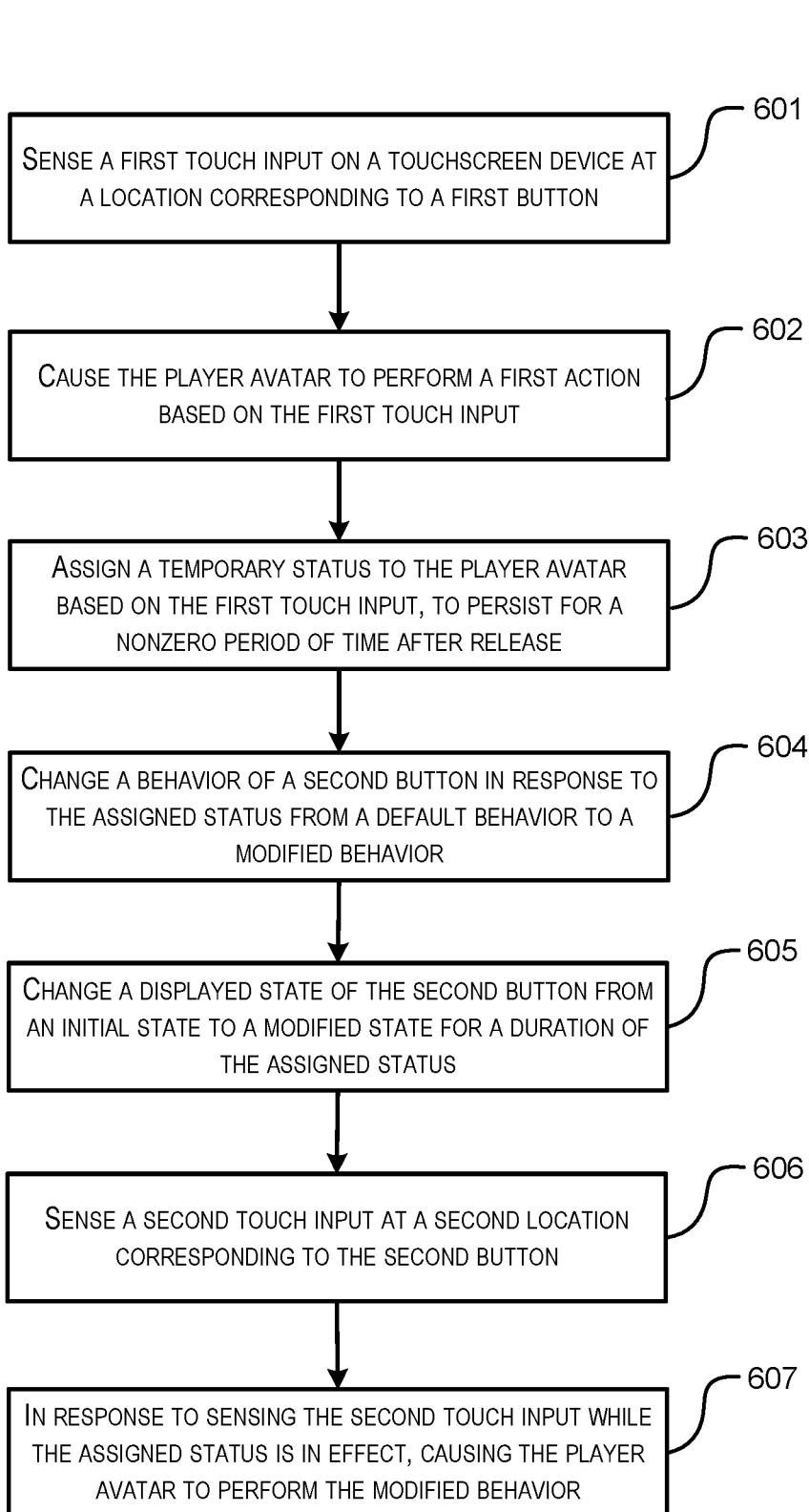

601

SENSE A FIRST TOUCH INPUT ON A TOUCHSCREEN DEVICE AT A LOCATION CORRESPONDING TO A FIRST BUTTON

602

CAUSE THE PLAYER AVATAR TO PERFORM A FIRST ACTION BASED ON THE FIRST TOUCH INPUT

603

ASSIGN A TEMPORARY STATUS TO THE PLAYER AVATAR BASED ON THE FIRST TOUCH INPUT, TO PERSIST FOR A NONZERO PERIOD OF TIME AFTER RELEASE

604

CHANGE A BEHAVIOR OF A SECOND BUTTON IN RESPONSE TO THE ASSIGNED STATUS FROM A DEFAULT BEHAVIOR TO A MODIFIED BEHAVIOR

605

CHANGE A DISPLAYED STATE OF THE SECOND BUTTON FROM AN INITIAL STATE TO A MODIFIED STATE FOR A DURATION OF THE ASSIGNED STATUS

606

SENSE A SECOND TOUCH INPUT AT A SECOND LOCATION CORRESPONDING TO THE SECOND BUTTON

607

IN RESPONSE TO SENSING THE SECOND TOUCH INPUT WHILE THE ASSIGNED STATUS IS IN EFFECT, CAUSING THE PLAYER AVATAR TO PERFORM THE MODIFIED BEHAVIOR

RECEIVE FIRST TOUCH INPUT FOR AN INPUT MECHANISM — 702

DETERMINE A FIRST STATE THAT IS CURRENTLY ACTIVE — 704

GENERATE FIRST ACTIVATION DATA BASED ON THE FIRST STATE — 706

RECEIVE SECOND TOUCH INPUT FOR THE INPUT MECHANISM — 708

DETERMINE A SECOND STATE THAT IS CURRENTLY ACTIVE — 710

GENERATE SECOND ACTIVATION DATA DIFFERENT FROM THE FIRST ACTIVATION DATA — 712

STATE BASED ACTION BUTTONS

BACKGROUND

Modern computer controller systems, such as those used by computer and video games, as well as by general-use operating systems, employ a variety of techniques to direct the movement of objects displayed on-screen. Known techniques include the use of an external control device such as a mouse, directional nub, touchpad, pen, game controller, or joystick to create either a directional vector or to designate a position for moving an on-screen object, such as a pointer or reticule, or to cause movement of a user's viewpoint.

Some techniques can employ an additional layer of sophistication by measuring the speed of movement of the external device to enhance movement of the on-screen object by changing the behavior of the on-screen object in response to a parameter of the input (e.g., acceleration of a pointer based on the speed at which an external device is moved). Touch-enabled devices can also be configured to accept inputs in ways that simulate the behavior of external control devices. However, control schemes for touch-enabled devices tend to fall short of the tactile feel and responsiveness that have been achieved in physical controllers, and further development in this field is warranted. For example, some touch-enabled control schemes are presented in extant games, however, existing control schemes fail to take advantage of the flexibility conferred by virtualization.

SUMMARY

Techniques are provided herein for implementing a virtual controller in which input mechanisms may be updated dynamically based on current states as those states are updated. In embodiments, actions associated with one or more buttons of the controller may change as different buttons are pushed and/or different actions are performed.

In one embodiment, a method is disclosed as being performed by a user device, the method comprising receiving, from a user via a touchscreen display, a first touch input corresponding to at least one input mechanism of a set of input mechanisms, determining a first state that is currently active, and generating, based on the first state, first activation data that includes an indication of a first action. The method further comprising receiving, from the user via the touchscreen display, a second touch input corresponding to the at least one input mechanism, determining a second state that is currently active, and generating, based on the second state, second activation data that includes an indication of a second action different from the first action.

An embodiment is directed to a computing system comprising a processor: and a memory including instructions that, when executed with the processor, cause the computing device to, at least receive, from a user via a touchscreen display, a first touch input corresponding to at least one input mechanism of a set of input mechanisms, determine a first state that is currently active, generate, based on the first state, first activation data that includes an indication of a first action, receive, from the user via the touchscreen display, a second touch input corresponding to the at least one input mechanism, determine a second state that is currently active, and generate, based on the second state, second activation data that includes an indication of a second action different from the first action.

An embodiment is directed to a non-transitory computer-readable media collectively storing computer-executable instructions that upon execution cause one or more computing devices to collectively perform acts comprising receiving, from a user via a touchscreen display, a first touch input corresponding to at least one input mechanism of a set of input mechanisms, determining a first state that is currently active, and generating, based on the first state, first activation data that includes an indication of a first action. The acts further comprising receiving, from the user via the touchscreen display, a second touch input corresponding to the at least one input mechanism, determining a second state that is currently active, and generating, based on the second state, second activation data that includes an indication of a second action different from the first action.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 depicts a block diagram illustrating a process for providing dynamic state changes of buttons used to control an avatar in accordance with some embodiments.

DETAILED DESCRIPTION

Figure 1:
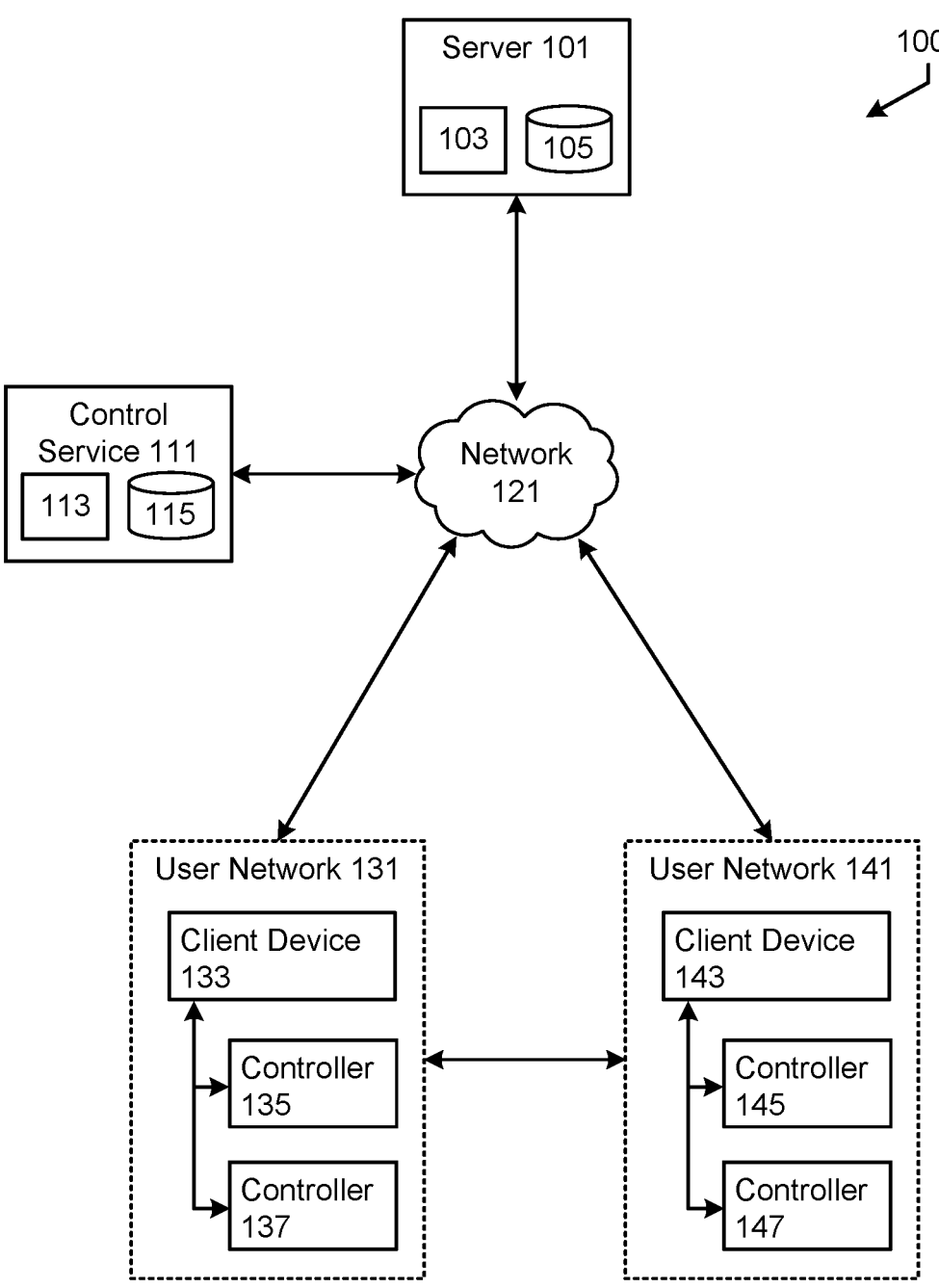
FIG. 1 is a simplified system diagram illustrating a service environment in which a virtual controller can be used, in accordance with various embodiments of the present disclosure

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to techniques for providing virtual controller configurations that may be dynamically adapted based on state. For example, when the virtual controller is implemented for a video game, this may involve dynamically changing the appearance and function of a virtual button based on the state and interaction history of a different virtual button. The methods use user input (if the user is presently touching the button), the tracked state for past behavior, as well as the state of the user's in-game controlled "avatar".

Embodiments of the disclosure provide for a number of advantages over conventional systems. For handheld flat screen devices that can be used as virtual controller (like mobile phones), screen real estate is at a premium. For games that are intended to be played holding the device in a horizontal (or "landscape") fashion, there is limited space to provide input to the game with both hands and still have enough space to see actual in-game gameplay (if a mobile game) or to view the control scheme or ancillary information (if a console or PC game played with a virtual controller).

This space limitation means games need to be careful with the number and size of UI elements on screen. When combined with physical contains of a human's hands (ex. size of the player's thumb, length of thumb nails, orientation and angle of thumb joint), there are hard constraints and trade-offs around wanting to provide more ways to give input (more buttons for more complex input actions), the size and locations of those buttons (impacting how easy they are for the user to physically touch), and the remaining "screen real estate" to see in-game action. For comparison, a typical modern console game traditionally uses 8 buttons to provide input, often with the expectation that players are using multiple buttons simultaneously (ex. using right thumb+right index simultaneously).

Lastly, the goal of input design is to enable input based on "muscle memory". After a short training/instruction to controls, given a desire ("I want my in-game avatar to jump"), a user should no longer need to physically look at where the button is located on screen to know which button should hit. Their thumb should automatically and instinctively move to the correct location and touch the virtual button. Most mobile game approach these problems by either reducing the number of buttons (often by reducing the complexity of the game), adding a large number of on-screen buttons that are transparent (to not block the in-game action) or dynamically changing the text of an on-screen button based on game state.

The present disclosure, in contrast, leverages the current state of a virtual button (pressed or not pressed), the previous state of a virtual button (has it been pressed some amount of time ago), and the state of the player's avatar (ex. "can my character do X right now?") to minimize the number of buttons without decreasing complexity or requiring changes in game state.

FIG. 1 is a simplified system diagram illustrating a service environment 100 in which a virtual controller can be used, in accordance with various embodiments of the present disclosure. The service environment 100 includes at least one server 101, which includes at least one processor 103 and non-transitory memory 105 storing as software instructions to facilitate operation of the service environment. The server 101 is connected via a network 121 (e.g., the Internet or a local network), with any suitable number of user-owned client devices 133, 143, which typically operate in conjunction with respective local user networks 131, 141 (e.g., consumer or commercial local area networks, WIFI networks, etc.)

The server 101 can also connect to any suitable number of control services 111, e.g., network-connected computing systems with their own processors 113 and memory 115 that monitor network to and from the server 101 and client devices 133, 143. In some embodiments, the server 101 can be one or more servers operating at commercial scale, e.g., a datacenter or server farm. Client devices 133, 143 can include, but are not limited to, consumer personal computers, video game consoles, thin-client devices operable to stream video content from the server 101 for presentation on a local screen, or mobile devices such as smartphones, tablets, or the like. Client devices 133, 143 can connect to any suitable number of controllers, e.g., controller 135, 137, 145, 147.

Each controller (e.g., controller 135) can be hardware devices (e.g., console-specific controllers, cross-compatible controllers, or virtual controllers) with connectivity hardware and protocols for communicating with their respective client device 133. According to some embodiments, controller 135 can be a virtualized controller operating on a thin-client device or touchscreen device, e.g., a controller simulated on a touchscreen smartphone, tablet, or console-like controller with a touch-enabled panel. According to some further embodiments, e.g., where the client device 133 is a thin-client device or mobile device, controller 135 can be a touchscreen with virtualized controls that is built-in to the client device. Alternatively, even where the client device 133 is a thin-client device, controller 135 can be a hardware controller configured to physically or wirelessly connect with the client device. According to some embodiments, the client device 133 and server 101 can operate on the same hardware, e.g., the client device running as a virtual instance on the server.

The methods described herein can be implemented on client devices in conjunction with a service environment such as service environment 100 described in FIG. 1. The methods can further work in the context of arbitrary placement of the virtual controller, which controls both avatar facing and movement, on-screen.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
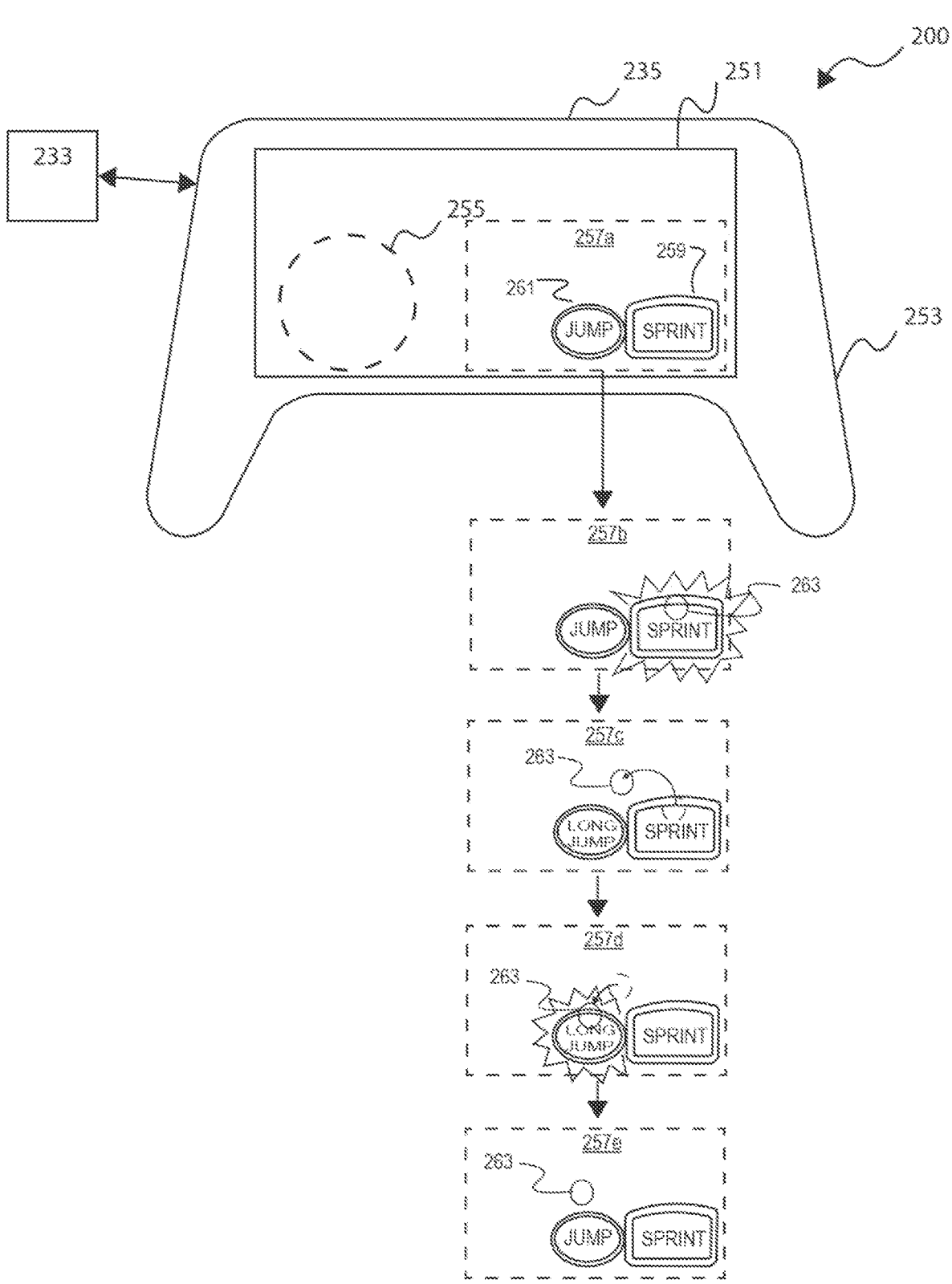
FIG. 2 depicts an illustrative example of an environment that includes a virtual controller in communication with a video game system in accordance with various embodiments.

FIG. 2 depicts an illustrative example of an environment 200 that includes a virtual controller 235 in communication with a video game system (e.g., a gaming console) 233, in accordance with various embodiments. The virtual controller 235 includes a touchscreen 251, a frame 253, and virtualized controls, e.g., 255 and 257. For example, imagine two virtual buttons ("Sprint" being a first virtual button 259 and "Jump" being the second virtual button 261). They can be triggered independently (users can press or hold either button with their thumb).

When the "Sprint" button is pressed at 257b (e.g., a touch 263 appears in the boundary of the "Sprint" button), we can indicate a successful touch by one or more of the following actions: a change the appearance of the "sprint" button (icon texture), haptic feedback, audio, and if the controlled avatar can perform a "Long Jump", a state of the character may be changed to "sprinting" and we change the text of the "Jump" button 261 to read "Long Jump," alone or in combination with a change in button color or texture. Responsive to the "sprint" command, the player's avatar starts sprinting. When the user slides their thumb off "Sprint" towards "Long Jump," at 257c, the appearance of the "Sprint" button changes (icon texture) to give the user immediate feedback they are no longer touching it (it returns to the default state). However, even though the user is no longer touching "Sprint", we track the time they stopped pressing the button and start a timer. When the user's thumb presses the "Long Jump" button at 257d, we indicate a successful touch by one or more of: changing the appearance of the "Long Jump" button (icon texture), haptic feedback, or audio: and the player's avatar now performs a "Long Jump" responsive to the command from the second button. Thus, the behavior of the second button changes dynamically, without a change in global game state, based on a combination of the recent button presses and the player avatar's status.

When the "sprint" timer expires, the character may revert from the "sprinting" state and the "Long Jump" button text can revert to saying "Jump" and the player's avatar stops sprinting. When the user lifts their thumb off the "Jump" button at 257e, the "Jump" button appearance (icon texture) returns to the default state as well, indicating the default status of both buttons. In this way, the user can now provide input to have their avatar do either a "jump" or "long jump" without requiring an additional button explicitly for "Long Jump," and without deviating from the expected control scheme (i.e., related tasks like "jump" and "long jump" can be context-dependent on whether the character is sprinting). These methods differ from combination-based context cues in that, in conventional games, button presses are either simultaneous (e.g., left-hand directional controls plus right-hand button controls) or fail to signal a change in the button behavior via changing a virtual button when the context requirement has been met (e.g., right-hand "code" or "combo" entries).

Figure 3:
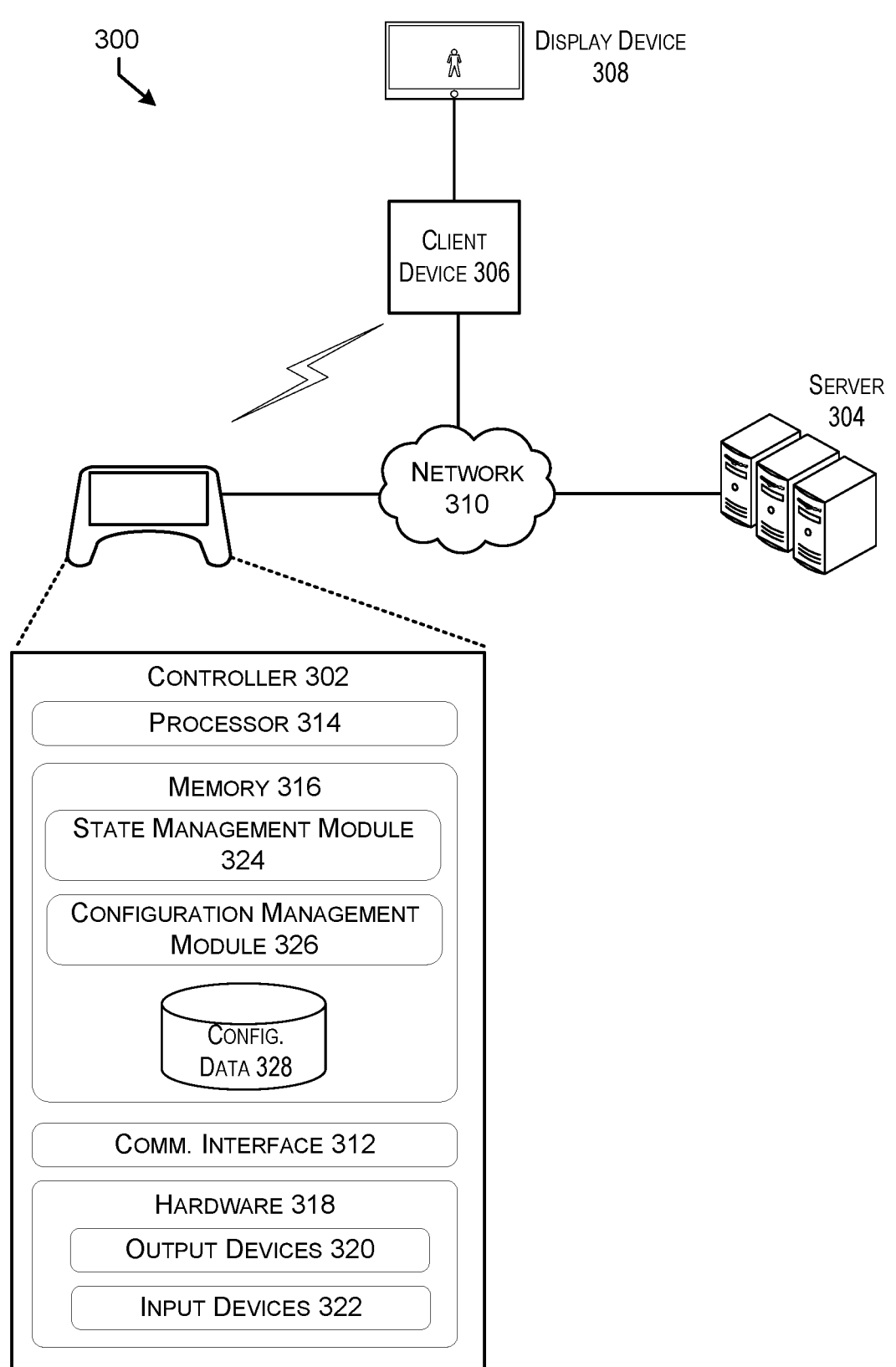
FIG. 3 is a block diagram showing various components of a computing system architecture that supports implementation of a virtualized physical controller in accordance with embodiments.

FIG. 3 is a block diagram showing various components of a computing system architecture that supports implementation of a virtualized physical controller in accordance with embodiments. The system architecture may include at least one controller 302. In some embodiments, the controller 302 may be in communication with one or more server 304, which may be an example of the server 101 as described with respect to FIG. 1. In some embodiments, the one or more server 101 may provide backend support for the controller 302. For example, at least a portion of the processing described as being performed by the controller 302 may instead be performed by the server 101 in some cases. In some embodiments, the controller 302 may be in communication with a client device 306. The client device 306 may be an example of client device 133 or 143 as described in relation to FIG. 1 above. In some embodiments, the client device 306 may be in further communication with a display device 308. Each of the components described herein may be in communication via a connection over a network 310.

The controller 302 may include any suitable computing device configured to perform at least a portion of the operations described herein and configured to enable a user to interact with a software application. In some embodiments, the controller may be a mobile device (e.g., a smartphone or tablet) having touchscreen capabilities. The controller 302 may include a communication interface 312, one or more processors 314, memory 316, and hardware 318. The communication interface 312 may include wireless and/or wired communication components that enable the controller 302 to transmit data to and receive data from other networked devices. The hardware 318 may include additional user interface, data communication, or data storage hardware. For example, the user interfaces may include at least one output device 320 (e.g., visual display, audio speakers, and/or haptic feedback device), and one or more data input devices 322. The data input devices 322 may include, but are not limited to, combinations of one or more of keypads, keyboards, mouse devices, touchscreens that accept gestures, microphones, voice or speech recognition devices, and any other suitable devices.

The memory 316 may be implemented using computer-readable media, such as computer storage media. Computer-readable media includes, at least, two types of computer-readable media, namely computer storage media and communications media. Computer storage media includes any suitable volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 314 and the memory 316 of the controller may implement functionality that includes one or more software modules and data stores. Such software modules may include routines, program instructions, objects, and/or data structures that are executed by the processors 314 to perform particular tasks or implement particular data types. More particularly, the memory 316 may include a module that is configured to determine a current state for the controller and implement an input mechanism configuration based on such a state (e.g., state management module 324) as well as a module that is configured to maintain and implement configuration information for input mechanisms of a virtualized controller (e.g., configuration management module 326).

Additionally, the memory 316 may include various data stores. For example, the memory 316 may maintain data about virtualized controller configurations based on context (e.g., configuration data 328). In some embodiments, such configuration data may include an indication of one or more aspects of the input mechanisms that should be implemented based on state. For example, the configuration data may include an indication of a size, location, shape, appearance (e.g., color, shading, and/or text) of each input mechanism as related to individual states. In some cases, the configuration data may indicate which input mechanisms should or should not be presented during a particular state.

The state management module 324 may be configured to, in conjunction with the processor 314, implement one or more input mechanisms based on a detected state and a configuration data. In some cases, the state management module is configured to monitor for changes in state. Such changes in state may be caused when an input mechanism is activated or when some other condition has been met. Upon detecting a change in state, the state management module may be configured to determine the current state (or states) of the controller or a software application in communication with the controller and implement each appropriate input mechanism based on that state. This may involve providing an indication of which input mechanisms should be presented as well as how each of those input mechanisms should be presented.

The configuration management module 326 may be configured to, in conjunction with the processor 314, generate and manage configuration information in relation to an arrangement of one or more input mechanisms within a user interface presented on the controller 302. In some embodiments, the configuration management module facilitates customization of input mechanism layout in accordance with some embodiments. It should be noted that such customization is described in related Patent Cooperation Treaty (PCT) Application Number US2022/019240 entitled "Virtualized Physical Controller," by Gregory Peng, which is herein incorporated by reference in its entirety.

In some embodiments, configuration data may be customized by a user to indicate a layout/appearance of input mechanisms as presented by a virtual controller. Additionally, such layout/appearance information stored in the configuration data for each input mechanism may be customized by a user on a state-by-state basis. In other words, how each input mechanism is presented with respect to each state (including its appearance, location, size, shape, or other suitable factor) may be dictated at least in part on input provided by a user.

The server 304 can include any computing device configured to perform at least a portion of the operations attributed to it. The server 304 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 304 can include one or more virtual machines running virtual operating systems, or other computing architectures involving virtualization such as one or more flexible pools of logical storage devices that can be virtualized to maintain virtual storage devices for the computer. For example, the server 304 may include virtual computing devices in the form of virtual machines or software containers that are hosted in a cloud.

The client device 306 may include any suitable computing device configured to receive input from the controller 302 and perform an action based on that input. In some embodiments, the client device may be a gaming system, such as a gaming console that may receive input from a number of controllers, each of which may be used to control an avatar or character within a software application (e.g., a computer game).

Figure 4:
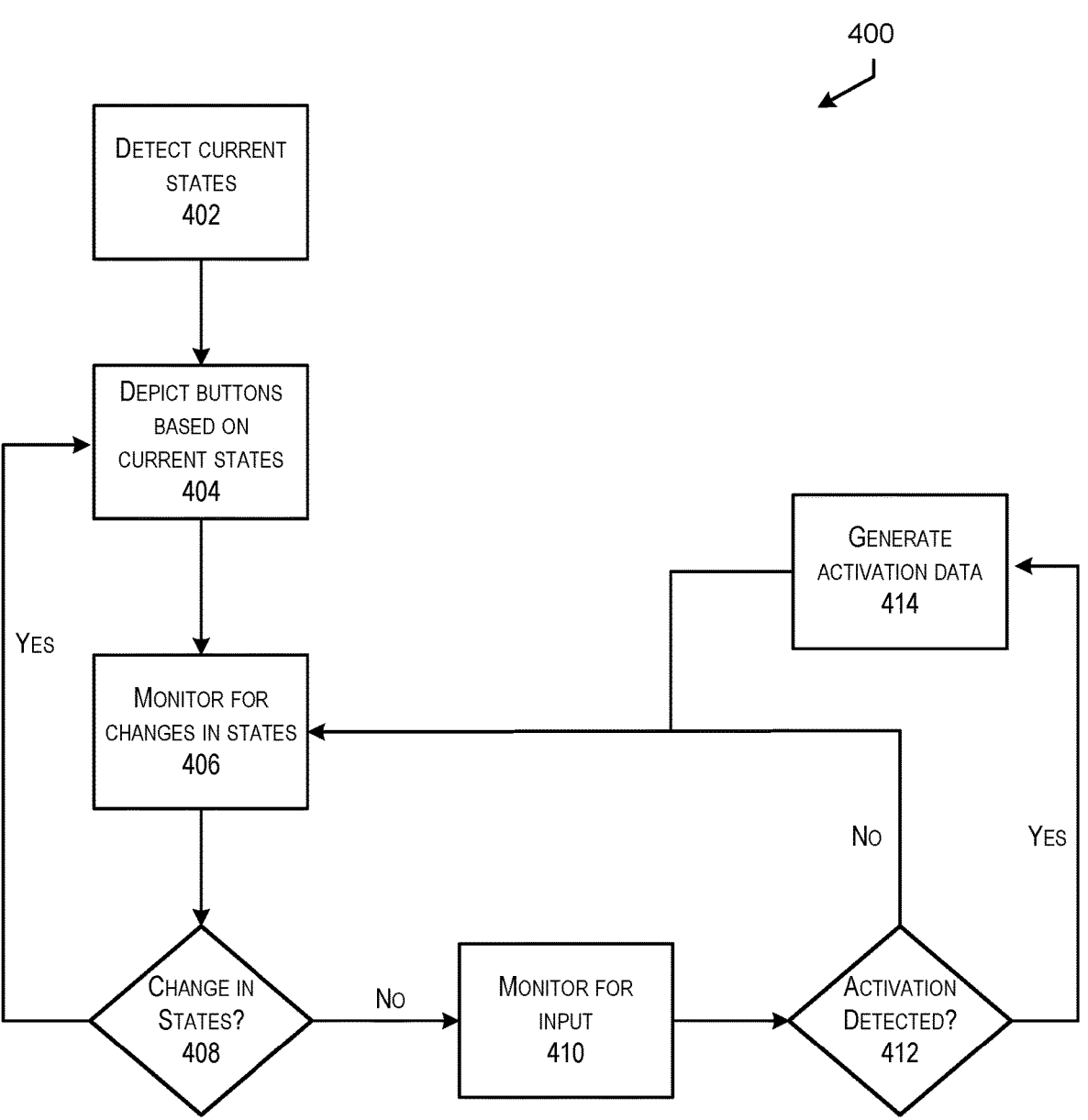
FIG. 4 depicts a block diagram illustrating a process for implementing a dynamic state-based controller in accordance with embodiments.

FIG. 4 depicts a block diagram illustrating a process for implementing a dynamic state-based controller in accordance with embodiments. The process 400 may be performed on a user device upon which a virtual physical controller is implemented, such as the controller 302 as described with respect to FIG. 3 above.

At 402, the process 400 may involve detecting current states applicable to a virtual controller that is being operated. In some embodiments, state data may be provided to the virtual controller by a software application that is being interacted with via the virtual controller. In some embodiments, multiple states may be applicable at a given time. For example, where the software application is a video game, one state may correspond to a character that is currently being played while a second state may correspond to an action that is currently being performed by that character.

At 404, the process 400 may involve depicting buttons (or other input mechanisms) based on the detected current states. In some embodiments, a set of configuration data for the virtual controller may include an indication of how each button should be depicted based on different states. In the configuration data, each button may be associated with a default appearance. Additionally, each button may be assigned to different appearances based on different detected states. In some cases, each button may be assigned a different size, location, and/or shape based on a current determined state. In some embodiments, one or more of the buttons may only be implemented (e.g., visible and able to be interacted with) during particular states.

At 406, the process 400 may involve monitoring for changes in states. In some embodiments, a change in state may be detected upon activation of an input mechanism. For example, if a player pushes a button intended to result in an action, a state may be initiated corresponding to that action. In some embodiments, one or more states may be temporary, in that they are set to be a current state for a predetermined amount of time, in such cases, the state may expire at the end of the predetermined amount of time.

At 408, the process 400 may involve determining whether any changes in state have occurred (e.g., as detected at 406). If such changes have been detected in the current states, then the process may return to 404 and a depiction of one or more buttons for the virtual controller may be implemented for the newly detected state. In some cases, an appearance of one or more buttons may be updated based on the newly-detected state. For example, text on a button may be altered or otherwise updated based on information included in the configuration data.

If no changes in state have been detected, the process 400 may involve monitoring for user input at 410 (e.g., touch input). In embodiments, user input may be detected upon detecting a user touch originating within one or more regions associated with buttons that have been implemented. Particularly, as user touch input is detected, a determination may be made as to whether that touch input is located within one or more regions associated with one or more of the buttons that are currently implemented. Based on whether touch input is detected from a user, and whether that touch input falls within one or more of the regions of the currently-implemented buttons, a determination may be made as to whether an activation of at least one button has been detected at 412. If no activation is detected, the process may involve continuing to monitor for changes in state at 406.

At 414, if an activation of at least one button has been detected, the process 400 may involve generating activation data based on the activation of the button. The activation data may comprise an indication of the button or buttons for which the activation has been detected. A determination may be made as to what actions should be initiated by the activation of the button based on what state/states are currently active. In some embodiments, the configuration data for the virtual controller may maintain information about what actions are to be initiated upon activation of each button and in which states. The generated activation data may include an indication of an action associated with the activation of the button in the current detected state.

In some cases, the activation data may further include information about a degree or amount associated with the activation, such as a length of time that the user touched the button, a direction and/or length of a swipe operation performed by the user in relation to the button, a length of time that the user touched the button, or any other suitable information. Once the activation data has been generated, the process may return to monitoring for changes in states at 406.

Figure 5:
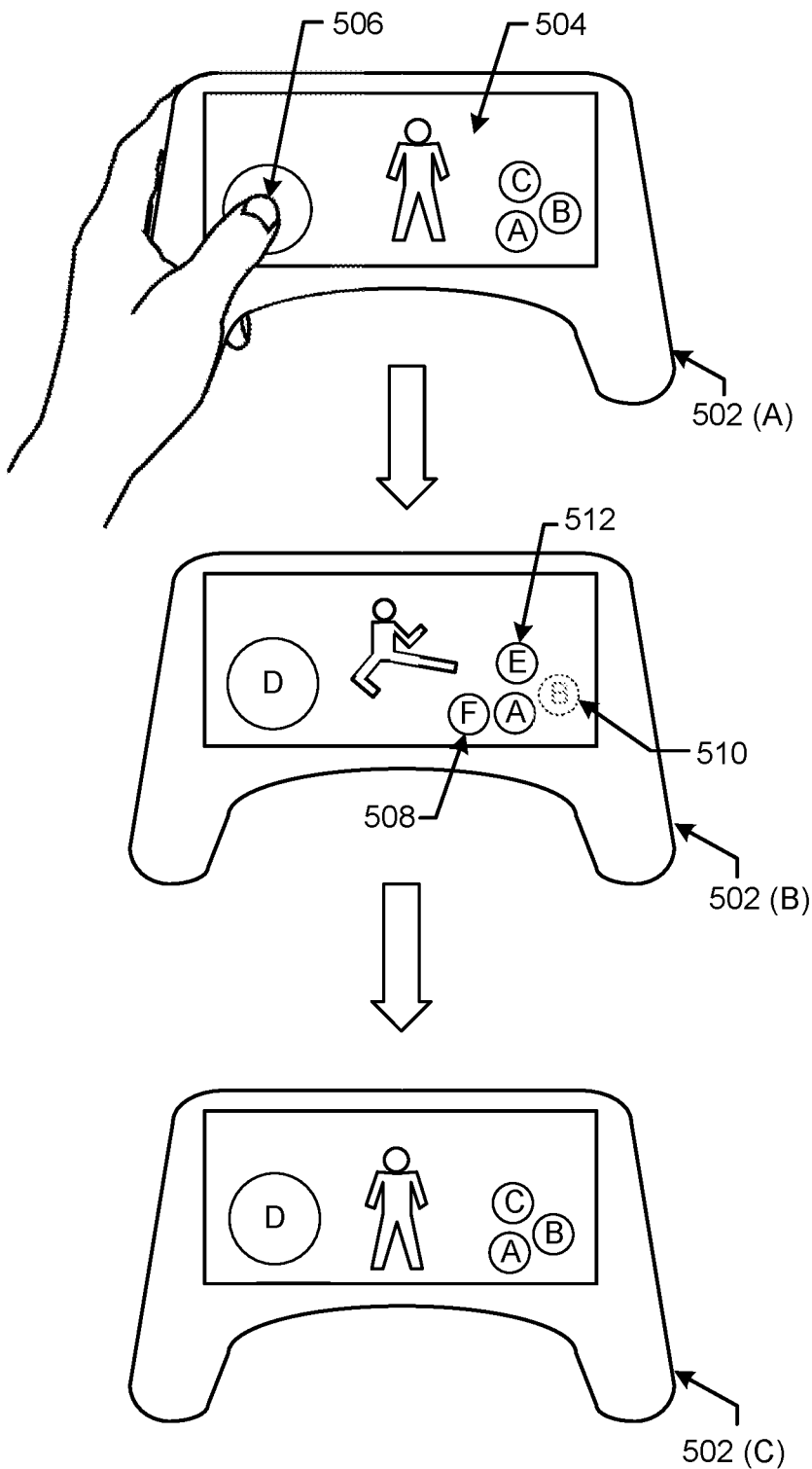
FIG. 5 depicts a graphical illustration of a process for dynamically adjusting input mechanisms (i.e., buttons) on a virtual controller in accordance with embodiments.

FIG. 5 depicts a graphical illustration of a process for dynamically adjusting input mechanisms (i.e., buttons) on a virtual controller in accordance with embodiments. The process 500 is depicted on a series of images of a user device 502 (A-C) on which a virtual controller may be implemented. As depicted, the virtual controller may be implemented via a graphical user interface (GUI) 504 that is presented on a touchscreen display.

At 502 (A), a first state may be detected with respect to the virtual controller. In the depicted example, configuration data associated with the virtual controller may indicate information for implementing one or more input mechanisms on the virtual controller in each state. In some embodiments, where implementation of a particular input mechanism is conflicting for each of two different states that are determined to be active, the configuration data may further indicate which implementation is to take priority when the two states are detected.

In some embodiments, the user may provide touch input to an input mechanism as depicted at 506. Upon detecting the touch input, a determination may be made, based on the detected first state, that a first action is to be initiated. Activation data may then be generated to initiate that action. Upon the action being initiated, a second state may be detected.

By way of example, consider a scenario in which a virtual controller is implemented on a mobile device that is executing a video game. In this scenario, a character in the video game may be in a "standing" state (i.e., a first state). The user may touch a button (e.g., an input mechanism) corresponding to the performance of a "jump" action. In this example, once the user has touched the jump button, the character may initiate a jump action and a second "jump" state (i.e., a second state) may be detected. In this scenario, where contradictions exist between the implementation of a particular button in the configuration data in a "standing" state versus a "jump" state may be resolved in favor of the "jump" state.

At 502 (B), a second state may be detected by the virtual controller. In some cases, the state may be additive to the first state (i.e., both states may be active at the same time). In other cases, the states may be mutually exclusive, in that the activation of a state may replace a current state. Upon detecting the second state, the virtual controller may determine whether one or more of the input mechanisms requires updating. To do this, configuration data may be consulted to determine implementation data for each input mechanism in the configuration data. Based on such implementation data, the virtual controller may update a location, size, shape, appearance (e.g., text), and/or action associated with the input mechanism.

As depicted, upon detecting the second state, the virtual controller may update the implemented input mechanisms. In some cases, this may involve adding or showing input mechanisms that are to be active while the second state is active (e.g., input mechanism 508). In some cases, this involves removing, deactivating, or hiding input mechanisms that are not to be active while the second state is active (e.g., input mechanism 510). In some cases, this involves changing an appearance of one or more input mechanisms (e.g., input mechanism 512).

At 502 (C), a determination may be made that the second state is no longer active. In some cases, this may result from another state replacing the second state. In some cases, this may result from the second state having expired (e.g., in the case that the second state is a temporary state) after a predetermined amount of time associated with the second state has expired. In some embodiments, the second state may persist for as long as the user continues to provide touch input to a button. For example, a "sprint" state may persist for as long as a user holds down a "sprint" button.

By way of example, consider a continuation of the example scenario presented above. Upon detecting that the "jump" state is active, the button configuration may be updated by the virtual controller such that each of the buttons in the current button configuration is implemented in a manner associated with the jump state. One or more of those buttons, when touched, may cause an action to be performed that is different from the action that would be taken during the standing state. In this example, the jump state may persist for as long as the character is jumping, which may depend on a set amount of time that the character spends on a jump, a degree with which the user pressed a jump button, or any other suitable factor. Continuing with this example scenario, once the jump has been completed, the state may return to the first "standing" state. Each of the buttons may then be re-implemented in accordance with the first state.

FIG. 6 depicts a block diagram illustrating a process for providing dynamic state changes of buttons used to control an avatar in accordance with some embodiments. The process 600 can be performed on any suitable service environment, including but not limited to service environment 100 shown in FIG. 1. In accordance with various embodiments, process 600 includes sensing a first touch input on a touchscreen device at a location corresponding to a first button at 601. The system can then cause the player avatar to perform a first action based on the first touch input at 602, and assign a status to the player avatar based on the first touch input, where the status is persistent for a nonzero period of time after a release of the first touch input at 603, e.g., a player's avatar is "sprinting" on screen while assigned the status "sprinting," which persists for some moments after the "sprint" button is released.

In the process 600, the behavior of a second button is temporarily modified in response to the assigned status from a default behavior to a modified behavior at 604, e.g., "jump" is changed to "long jump," or "attack" is changed to "charging attack," etc. A displayed state of the second button, i.e., a name displayed to the user, can be changed also from an initial state to a modified state for a duration of the assigned status at 605, thus, not only does the behavior of a button change, but its visible properties as well.

When the system senses a second touch input at a second location corresponding to the second button at 606, provided the behavior of the second button is still modified (i.e., within a period of time after release of the first button), the system reads the second input and causes the player avatar to perform the modified action of the second button rather than the default action based on the second touch input at 607. In contrast, if the modified behavior had timed out, the system would cause the player avatar to perform the default action corresponding to the second button instead.

Figure 7:
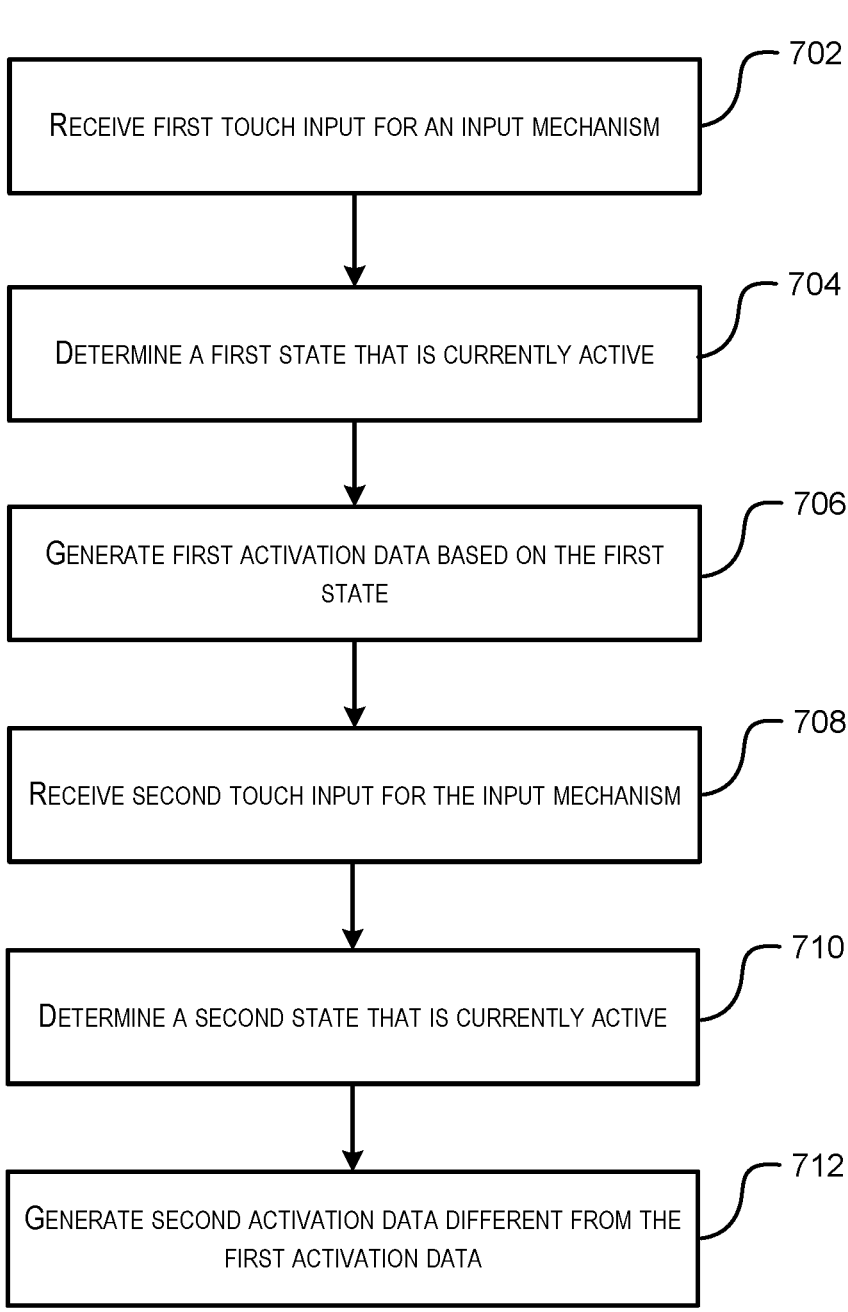
FIG. 7 depicts a flow diagram showing an example process flow for generating an implementing a virtualized physical controller in accordance with embodiments.

FIG. 7 depicts a flow diagram showing an example process flow 700 for generating an implementing a virtualized physical controller in accordance with embodiments. The process 700 may be performed by a computing device that is configured to generate and provide a product strategy for a product. For example, the process 700 may be performed by a controller capable of facilitating interaction between the user and a software application., such as the controller 302 described with respect to FIG. 3 above. IN some embodiments, such a software application is a video game played by the user.

At 702, the process 700 comprises receiving first touch input corresponding to an input mechanism of a set of input mechanisms implemented on the controller. As noted elsewhere, the controller may include a touchscreen display, and the first touch input (as well as the second touch input) may be received from the user via the touchscreen display. In some embodiments, the user device is one of a smartphone or tablet device.

At 704, the process 700 comprises determining a first state that is currently applicable to the controller. In some embodiments, a first state may be a default state or a state in which the software application is initiated.

At 706, the process 700 comprises generating first activation data based on the activation of the input mechanism and the first state. The first activation data may include information on one or more actions triggered by the input mechanism.

At 708, the process 700 comprises receiving second touch input corresponding to the input mechanism implemented on the controller. Similar to the first touch, the second touch may be received via touch input provided on a touchscreen display of the controller.

At 710, the process 700 comprises determining a second state that is currently applicable to the controller. In some embodiments, the second state may be initiated upon activation of a different input mechanism of the set of input mechanisms. For example, a user may press or touch a different button, which then causes the second state to be initiated. In some cases, states may be additive, in that the first state and the second state may both be active at the same time. In some cases, states may be exclusive, in that the second state replaces the first state, such that no more than one of the first state or the second state are active at the same time.

In some embodiments, the controller may detect when a second state has been initiated. Further, upon determining the second state is currently active, the process may involve updating at least one of a size, location, shape, or appearance of the input mechanism. In some embodiments, the process further involves, upon determining the second state is currently active, updating the set of input mechanisms by adding at least one additional input mechanism to the set of input mechanisms for the duration that the second state is active. For example, one or more additional buttons (or other suitable input mechanisms) may be added to the virtual controller while the second state is active. In some embodiments, the process further involves, upon determining the second state is currently active, updating the set of input mechanisms by removing at least one additional input mechanism from the set of input mechanisms for the duration that the second state is active. For example, one or more buttons (or other suitable input mechanisms) may be removed or otherwise made inactive while the second state is active. In some embodiments, each of the first state and the second state pertain to a status of an avatar being played by the user in the video game.

At 712, the process 700 comprises generating second activation data based on the activation of the input mechanism and the second state. In embodiments, one or more actions indicated in the second activation data are different from one or more actions indicated in the first activation data.

In some embodiments, the second state may be temporary, in that it persists for some non-zero amount of time. In some cases, the second state persists for a predetermined amount of time. In some cases, the second state persists for as long as some condition is met (e.g., as long as a user continues to press a button, etc.). Upon expiration of the second state, the virtual controller may revert to having the second state as being inactive and the first state as being active. In such cases, the process may further involve receiving a third touch input, determining that the second state is no longer active, and generating a third activation data that includes an indication of the first action.

The methods described herein are directed to virtual controllers, i.e., controllers that use a touchscreen or touchscreen-like functionality to provide for readily customized controller button layouts. According to some embodiments, the touchscreen is at least a portion of a physical, handheld controller that interfaces with a gaming device like a gaming console, personal computer, tablet, smartphone, thin client device (e.g., USB or HDMI device plugged in to a screen). According to some embodiments, the touchscreen is the predominant feature of the controller, which interfaces with a gaming device like a gaming console, personal computer, tablet, smartphone, thin client device (e.g., USB or HDMI device plugged in to a screen). According to some embodiments, the controller is made up of a mobile device or tablet in conjunction with enabling software that connects the mobile device or tablet to a gaming device like a gaming console, personal computer, thin client device (e.g., USB or HDMI device plugged in to a screen) or other suitable gaming device. According to some further embodiments, the touchscreen is a touch-enabled screen of a gaming device like a gaming console, personal computer, tablet, or smartphone.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following, further examples are described to facilitate understanding of aspects of the invention:

Example A. A method comprising:

receiving, from a user via a touchscreen display, a first touch input corresponding to at least one input mechanism of a set of input mechanisms:

determining a first state that is currently active:

generating, based on the first state, first activation data that includes an indication of a first action:

receiving, from the user via the touchscreen display, a second touch input corresponding to the at least one input mechanism;

determining a second state that is currently active; and generating, based on the second state, second activation data that includes an indication of a second action different from the first action.

Example B. The method of the preceding example, further comprising upon determining the second state is currently active updating at least one of a size, location, shape, or appearance of the at least one input mechanism.

Example C. The method of any of the preceding examples, further comprising upon determining the second state is currently active updating the set of input mechanisms by adding at least one additional input mechanism to the set of input mechanisms while the second state is active.

Example D. The method of any of the preceding examples, further comprising upon determining the second state is currently active updating the set of input mechanisms by removing at least one additional input mechanism from the set of input mechanisms while the second state is active.

Example E. The method of any of the preceding examples, wherein the first state and the second state are both determined to be active at the same time.

Example F. The method of any of the preceding examples, wherein the second state replaces the first state, such that no more than one of the first state or the second state are active at the same time.

Example G. The method of any of the preceding examples, wherein the second state is initiated upon activation of a different input mechanism of the set of input mechanisms.

Example H. The method of any of the preceding examples, wherein the second state persists for a predetermined amount of time.

Example I. The method of any of the preceding examples, further comprising: receiving a third touch input;

determining that the second state is no longer active; and generating a third activation data that includes an indication of the first action.

Example J. A user device comprising:

a processor; and a memory including instructions that, when executed with the processor, cause the user device to, at least:

receive, from a user, a first touch input corresponding to at least one input mechanism of a set of input mechanisms:

determine a first state that is currently active:

generate, based on the first state, first activation data that includes an indication of a first action:

receive, from the user, a second touch input corresponding to the at least one input mechanism:

determine a second state that is currently active: and generate, based on the second state, second activation data that includes an indication of a second action different from the first action.

Example K. The user device of the preceding example, further comprising a touchscreen display, wherein the first touch input and the second touch input are received from the user via the touchscreen display.

Example L. The user device of any of the preceding examples, wherein the user device is one of a smartphone or tablet device.

Example M. The user device of any of the preceding examples, wherein the instructions further cause the user device to, upon receiving a third touch input corresponding to a second input mechanism of the set of input mechanisms, initiate the second state, wherein the second input mechanism is different from the at least one input mechanism.

Example N. The user device of any of the preceding examples, wherein the instructions comprise a virtual controller capable of facilitating interaction between the user and a software application.

Example O. The user device of any of the preceding examples, wherein the software application comprises a video game played by the user.

Example P. The user device of any of the preceding examples, wherein each of the first state and the second state pertain to a status of an avatar being played by the user in the video game.

Example Q. The user device of any of the preceding examples, wherein the instructions further cause the user device to update at least one of a size, location, shape, or appearance of the at least one input mechanism upon determining the second state is currently active.

Example R. A non-transitory computer-readable media collectively storing computer-executable instructions that upon execution cause one or more computing devices to collectively perform acts comprising:

receiving, from a user via a touchscreen display, a first touch input corresponding to at least one input mechanism of a set of input mechanisms;

determining a first state that is currently active:

generating, based on the first state, first activation data that includes an indication of a first action:

receiving, from the user via the touchscreen display, a second touch input corresponding to the at least one input mechanism:

determining a second state that is currently active; and generating, based on the second state, second activation data that includes an indication of a second action different from the first action.

Example S. The non-transitory computer-readable media of the preceding example, further comprising upon determining the second state is currently active updating at least one of a size, location, shape, or appearance of the at least one input mechanism.

Example T. The non-transitory computer-readable media of any of the preceding examples, wherein the second state is initiated upon activation of a different input mechanism of the set of input mechanisms.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:

1. A method of state-based activation, the method comprising:

determining a first state within an interactive video game, wherein the first state corresponds to an active state of an object presented within the interactive video game and being controlled by a user using a virtual controller;

rendering at least two input mechanisms of a set of input mechanisms on a graphical user interface on a touchscreen display of a touch-enabled device based on the first state, wherein the at least two input mechanisms comprise a first input mechanism and a second input mechanism;

detecting a first touch input from the user on the touchscreen display of the touch-enabled device during the first state, wherein a location of the first touch input on the touchscreen display corresponds to a location of the first input mechanism of the at least two input mechanisms for the virtual controller presented as the graphical user interface on the touchscreen display and the first touch input from the user is determined to be activation of the first input mechanism based on the location of the first touch input corresponding to the location of the first input mechanism;

generating first activation data that includes an indication of a first action to be executed for the object within the interactive video game in response to the activation of the first input mechanism during the first state, wherein the first activation data is generated based on configuration data for the touch-enabled device that maintains information comprising actions to be initiated upon activation of each input mechanism of the set of input mechanisms in accordance with states within the interactive video game;

executing the first action for the object within the interactive video game based on the first activation data;

determining a second state within the interactive video game, wherein the second state corresponds to a different active state of the object presented within the interactive video game, and wherein the first state changed to the second state in response to executing the first action;

updating the rendering of the second input mechanism of the at least two input mechanisms on the graphical user interface based on the second state;

detecting a second touch input from the user on the touchscreen display during the second state, wherein a location of the second touch input on the touchscreen display corresponds to a location of the second input mechanism for the virtual controller presented as the graphical user interface on the touchscreen display and the second touch input from the user is determined to be activation of the second input mechanism based on the location of the second touch input corresponding to the location of the second input mechanism;

generating second activation data that includes an indication of a second action to be executed for the object within the interactive video game in response to the activation of the second input mechanism during the second state; and executing the second action for the object within the interactive video game based on the second activation data.

2. The method of claim 1, further comprising updating at least one of a size, location, shape, or appearance of the second input mechanism based on the second state.

3. The method of claim 1, further comprising updating the set of input mechanisms by adding an input mechanism to the set of input mechanisms presented on the touchscreen display while the second state is active.

4. The method of claim 1, further comprising updating the set of input mechanisms by removing an input mechanism from the set of input mechanisms presented on the touchscreen display while the second state is active.

5. The method of claim 1, wherein the first state and the second state are both determined to be active at a same time.

6. The method of claim 1, wherein the second state replaces the first state, such that no more than one of the first state or the second state are active at a same time.

7. The method of claim 1, further comprising initiating the second state upon selection of a different input mechanism of the set of input mechanisms presented on the touchscreen display.

8. The method of claim 1, wherein the second state persists for a predetermined amount of time.

9. The method of claim 1, further comprising:

detecting a third touch input from the user on the touchscreen display, wherein a location of the third touch input also corresponds to the location of the first input mechanism;

determining that the second state is no longer active; and generating a third activation data that includes an indication of the first action based on the determination that the second state is no longer active.

10. A user device comprising:

a processor; and a memory including instructions executable by the processor to, at least:

determine a first state within an interactive video game, wherein the first state corresponds to an active state of an object presented within the interactive video game and being controlled by a user using a virtual controller;

render at least two input mechanisms of a set of input mechanisms on a graphical user interface on a touchscreen display of a touch-enabled device based on the first state, wherein the at least two input mechanisms comprise a first input mechanism and a second input mechanism;

detect a first touch input from the user on the touchscreen display of the touch-enabled device during the first state, wherein a location of the first touch input on the touchscreen display corresponds to a location of the first input mechanism of the at least two input mechanisms for the virtual controller presented as the graphical user interface on the touchscreen display and the first touch input from the user is determined to be activation of the first input mechanism based on the location of the first touch input corresponding to the location of the first input mechanism;

generate first activation data that includes an indication of a first action to be executed for the object within the interactive video game in response to the activation of the first input mechanism during the first state, wherein the first activation data is generated based on configuration data for the touch-enabled device that maintains information comprising actions to be initiated upon activation of each input mechanism of the set of input mechanisms in accordance with states within the interactive video game;

execute the first action for the object within the interactive video game based on the first activation data;

determine a second state within the interactive video game, wherein the second state corresponds to a different active state of the object presented within the interactive video game, and wherein the first state changed to the second state in response to executing the first action;

update the rendering of the second input mechanism of the at least two input mechanisms on the graphical user interface based on the second state;

detect a second touch input from the user on the touchscreen display during the second state, wherein a location of the second touch input on the touchscreen display corresponds to a location of the second input mechanism for the virtual controller presented as the graphical user interface on the touchscreen display and the second touch input from the user is determined to be activation of the second input mechanism based on the location of the second touch input corresponding to the location of the second input mechanism;

generate second activation data that includes an indication of a second action to be executed for the object within the interactive video game in response to the activation of the second input mechanism during the second state; and execute the second action for the object within the interactive video game based on the second activation data.

11. The user device of claim 10, further comprising a touchscreen that generates the touchscreen display.

12. The user device of claim 10, wherein the user device is one of a smartphone or tablet device.

13. The user device of claim 10, wherein the instructions are further executable to:

detect a third touch input from the user at a location corresponding to the location of the first input mechanism;

determine that the second state is no longer active; and generate a third activation data that includes an indication of the first action based on the determination that the second state is no longer active.

14. The user device of claim 10, wherein the instructions are associated with the virtual controller specific to a software application.

15. The user device of claim 14, wherein the software application comprises the interactive video game.

16. The user device of claim 15, wherein each of the first state and the second state pertain to a status of an avatar in the interactive video game.

17. The user device of claim 10, wherein the instructions are further executable to update at least one of a size, location, shape, or appearance of the second input mechanism based on the second state.

18. A non-transitory computer-readable storage medium, having embodied thereon instructions executable by one or more computing devices to collectively perform acts comprising:

determining a first state within an interactive video game, wherein the first state corresponds to an active state of an object presented within the interactive video game and being controlled by a user using a virtual controller;

rendering at least two input mechanisms of a set of input mechanisms on a graphical user interface on a touchscreen display of a touch-enabled device based on the first state, wherein the at least two input mechanisms comprise a first input mechanism and a second input mechanism;

detecting a first touch input from the user on the touchscreen display of the touch-enabled device during the first state, wherein a location of the first touch input on the touchscreen display corresponds to a location of the first input mechanism of the at least two input mechanisms for the virtual controller presented as the graphical user interface on the touchscreen display and the first touch input from the user is determined to be activation of the first input mechanism based on the location of the first touch input corresponding to the location of the first input mechanism;

generating first activation data that includes an indication of a first action to be executed for the object within the interactive video game in response to the activation of the first input mechanism during the first state, wherein the first activation data is generated based on configuration data for the touch-enabled device that maintains information comprising actions to be initiated upon activation of each input mechanism of the set of input mechanisms in accordance with states within the interactive video game;

executing the first action for the object within the interactive video game based on the first activation data;

determining a second state within the interactive video game, wherein the second state corresponds to a different active state of the object presented within the interactive video game, and wherein the first state changed to the second state in response to executing the first action;

updating the rendering of the second input mechanism of the at least two input mechanisms on the graphical user interface based on the second state;

detecting a second touch input from the user on the touchscreen display during the second state, wherein a location of the second touch input on the touchscreen display corresponds to a location of the second input mechanism for the virtual controller presented as the graphical user interface on the touchscreen display and the second touch input from the user is determined to be activation of the second input mechanism based on the location of the second touch input corresponding to the location of the second input mechanism;

generating second activation data that includes an indication of a second action to be executed for the object within the interactive video game in response to the activation of the second input mechanism during the second state; and executing the second action for the object within the interactive video game based on the second activation data.

19. The non-transitory computer-readable storage medium of claim 18, wherein the acts further comprise updating at least one of a size, location, shape, or appearance of the second input mechanism based on the second state.

20. The non-transitory computer-readable storage medium of claim 18, wherein the acts further comprise:

detecting a third touch input from the user on the touch-screen display, wherein a location of the third touch input corresponds to the location of the first input mechanism;

determining that the second state is no longer active; and generating a third activation data that includes an indication of the first action based on the determination that the second state is no longer active.

* * * * *